United States Patent [19]

Baumeister

[11] Patent Number: 4,660,073
[45] Date of Patent: Apr. 21, 1987

[54] VIDEO APPARATUS FOR SELECTIVELY PROCESSING EITHER COMPOSITE OR COMPONENT COLOR VIDEO SIGNALS

[75] Inventor: Hans P. Baumeister, Churchville, N.Y.

[73] Assignee: Eastman Kodak Company, Rochester, N.Y.

[21] Appl. No.: 683,115

[22] Filed: Dec. 18, 1984

[51] Int. Cl.[4] .............................................. H04N 9/64
[52] U.S. Cl. ................................... 358/21 R; 358/22; 358/181; 358/188
[58] Field of Search ................... 358/10, 21 R, 22, 23, 358/11, 181, 188; 340/703, 721

[56] References Cited

U.S. PATENT DOCUMENTS 4,139,865 2/1979 Iida et al. ............................ 358/188
4,460,918 7/1984 Flasza ............................... 358/21 R Primary Examiner—John W. Shepperd
Attorney, Agent, or Firm—William F. Noval

[57] ABSTRACT

Video apparatus for selectively receiving composite color video signals and component color video signals and control circuitry for detecting whether a composite color or component color video signal has been received. The apparatus includes video signal processing circuitry which is selectively operable by said control circuitry in a first mode for processing composite color video signals and in a second mode for processing component color video signals in response to the particular color video signal detected. Preferably, the video apparatus includes a first input which selectively receives composite color video signals and the luminance component of component color video signals and a second input which receives the chrominance component of the component color video signal. The control circuitry includes a detector which detects the chrominance component received by the second input.

10 Claims, 5 Drawing Figures

| ROW | TYPE OF VIDEO SIGNAL | INPUT 30 | INPUT 32 | $V_P$ | CK | $S_1$ | $S_2$ | $S_3$ | $S_4$ | $S_{CK}$ |
|---|---|---|---|---|---|---|---|---|---|---|
| A | COMPONENT COLOR (Y,C) | YES | YES | YES | NO | CLOSED | OPEN | CLOSED | OPEN | CLOSED |
| B | MONOCHROME (Y) | YES | NO | NO | YES | OPEN | OPEN | CLOSED | CLOSED | OPEN |
| C | COMPOSITE COLOR (NTSC) | YES | NO | NO | NO | OPEN | CLOSED | OPEN | CLOSED | CLOSED |

FIG. 5

VIDEO APPARATUS FOR SELECTIVELY PROCESSING EITHER COMPOSITE OR COMPONENT COLOR VIDEO SIGNALS

BACKGROUND OF THE INVENTION

This invention relates generally to video apparatus. More particularly, this invention relates to video apparatus which detects whether composite color video signals or component color video signals are received and which is selectively operable to process either signal in response to the particular signal detected.

In color video systems, the primary color images of a scene are normally converted to matrixed signals for signal transmission and recording. Thus, in the NTSC color system the red, green, and blue images of a scene scanned by a color television camera are matrixed into luminance and chrominance component signals which are then multiplexed to produce a composite color video signal for transmission to a home television receiver. The composite signal is demultiplexed to separate the luminance and chrominance components which are then dematrixed to reproduce the red, blue, and green images which drive respective electron guns in the television receiver. The necessity for multiplexing the luminance and chrominance components into a composite signal for transmission and then for demultiplexing the signal to recover the luminance and chrominance components for use in a television set tend to produce degradation of picture image. Moreover, multiplexing and demultiplexing of the composite color video signal increases circuit complexity in both the transmitter and receiver thus increasing equipment cost. In addition, time base errors may be introduced during recording and reproducing of the composite signal resulting in a number of image artifacts.

Although government regulations presently require broadcast transmission of a composite color video signal, there are a growing number of user applications where composite color video signals are not or do not need to be used. Thus, video cassette recorders (VCRs) and video disc players record color video signal as a component signal. However, in most video equipment, the recorded component signal is multiplexed to a composite signal for local transmission to a TV which demultiplexes the signal. This results in unnecessary image degradation and equipment complexity. Moreover, home video cameras and home computers generate component color video signals which must also be multiplexed and demultiplexed for use with a standard television receiver which only accepts composite color video signals.

Thus, it has been proposed to by-pass use of the composite color video signal by utilizing the component color video signals directly. The use of component video signals results in higher picture resolution and truer color rendition since the full bandwidths of the component signals (e.g., luminance and chrominance components in the NTSC, PAL and SECAM systems, RGB components, etc.) are used without intercomponent interference. Moreover, problems resulting from time base errors are eliminated when the signals are recorded and/or reproduced since the component video signals are separate.

Considering the advantages of utilizing component color video signals, there has arisen a need for providing a technique for video apparatus (such as color TV receivers, color video cameras, color video disc and tape recorders) to automatically detect whether a composite color video signal or a component color video signal is being received and to control the video equipment to process the detected signal. Such a technique is advantageous for user convenience and simplicity and allows transmission of composite color and component color video signals over the same channels, reducing the necessity of separate channels (cables) for each type of signal.

SUMMARY OF THE INVENTION

According to the invention, there is provided video apparatus which selectively processes either composite color video signals or component color video signals. The apparatus includes means for detecting whether a composite color or a component color video signal is received so that signal processing circuitry may be controlled to process the received and detected color video signal. Preferably, a first input is provided for receiving composite color video signals and a first (e.g., luminance) component of a component color video signal and a second input is provided for receiving the chrominance component of the component color video signal. A detector senses the presence of the second (chrominance) component of the component video signal received at the second input in order to produce an indication signal which may be used to change the mode of operation of the video apparatus.

DESCRIPTION OF THE DRAWINGS

Referring now to the drawings in which like numbers indicate like elements,

FIG. 5 is a table showing the condition of the switches for various modes of operation of the apparatus of FIG. 3.

DESCRIPTION OF THE PREFERRED EMBODIMENT

Figure 1:
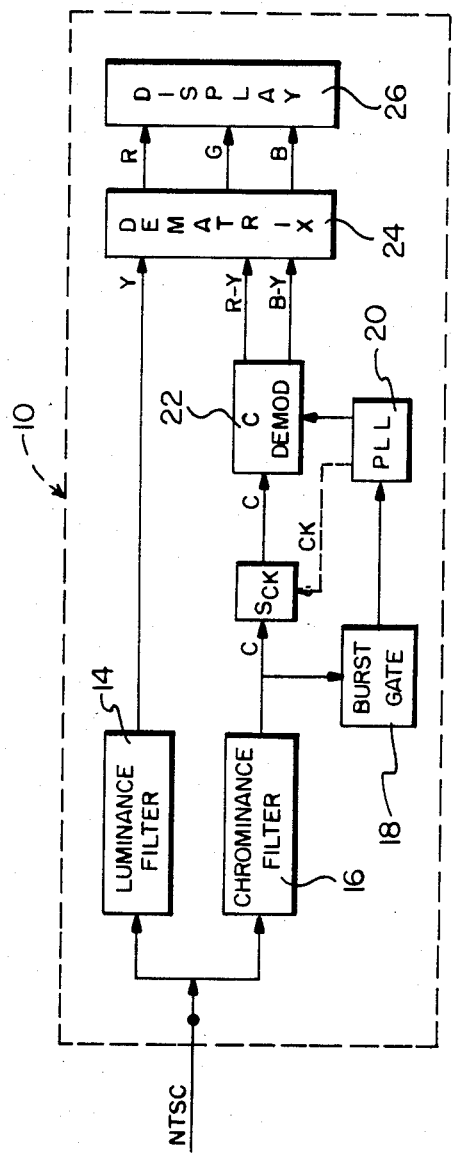
FIG. 1 is a block diagram of a conventional color video apparatus such as a television receiver.

Referring now to FIG. 1, there is shown a block diagram of pertinent signal processing circuits of a color video apparatus such as a television receiver 10. Apparatus 10 is adapted to receive a composite color video signal such as the NTSC composite signal used in the United States and Japan. This signal includes luminance and chrominance components which are frequency interleaved. As shown, the composite color video signal is received at input terminal 12 and supplied to a luminance filter 14 which separates out the luminance component Y of the composite signal and is also supplied to chrominance filter 16 which separates out the chrominance signal C. The chrominance signal C includes I and Q components which are quadrature modulated on a subcarrier frequency. Accompanying the chrominance signal is a burst of the subcarrier signal frequency (i.e. 3.58 Mhz subcarrier signal) which is applied via a burst gate 18 to a phase lock loop (PLL) circuit 20 which includes a crystal oscillator set to produce the exact subcarrier frequency. The burst of subcarrier frequency signal in the composite color video signal inhibits production of a color killer signal by PLL circuit 20. Switch $S_{ck}$ is closed so that the chrominance signal along with the phase lock loop subcarrier frequency signal will be applied to chrominance demodulator (C DEMOD) circuit 22. Circuit 22 produces two color difference signals R-Y and B-Y which are applied with the Y luminance component signal to dematrix circuit 24. Red (R), green (G), and blue (B) signals from circuit 24 produce a color picture on display device 26. As described above, it would be desirable if video apparatus 10 were capable of processing component color television signals directly so that image degradation produced by the luminance and chrominance filter circuits may be eliminated.

Figure 2:
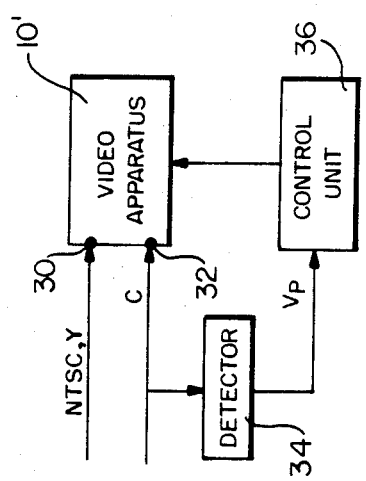
FIG. 2 is a block diagram of video apparatus using the technique of the present invention.

Referring now to FIG. 2, there is shown video apparatus using the technique according to the present invention which effects automatic detection of component color video signals received by a video apparatus such as a television receiver or a video cassette recorder. The video apparatus is adapted to operate in at least one of two modes depending upon whether composite color video signals are received or component color video signals are received. When the latter signals are received, the signal separating circuits used when composite signals are received are automatically bypassed so that the component signals are supplied directly to the dematrixing circuitry of the video apparatus. Although the NTSC composite color video signal described below has luminance (Y) and chrominance (C-I, Q) components, it will be understood that other composite color signals (e.g., PAL, SECAM) having different components (luminance, chrominance-B-Y, R-Y) may also be used in the technique of the present invention. Other component color video signals (e.g., RGB) may also be received by video apparatus 10'.

In FIG. 2, video apparatus 10' is adapted to receive either composite color video signals or component color video signals. The composite color video signal NTSC and the luminance signal Y of a component color video signal are received at input terminal 30 and the chrominance signal C of the component color video signal is received at input terminal 32. A detector 34 (e.g., a diode voltage detector) is provided to detect the presence of a chrominance signal C at input 32 and to produce an indication signal $V_P$ which is supplied to control unit 36. Control unit 36 may conveniently comprise a microprocessor such as the INTEL 8085 or may comprise a suitable logic circuit. (The operation and programming of microprocessors is well known to those skilled in the art and is described, for example, in THE ART OF ELECTRONICS, by Horowitz and Hill, Chapter 11, entitled: "Microprocessors", Page 484 and following). When a composite color video signal NTSC is received at input 30, apparatus 10' will operate in a first mode to process the composite color video signal. On the other hand, if a chrominance component signal C is received at input 32, detector 34 produces an indication signal $V_P$ which is supplied to control unit 36 which controls apparatus 26 to operate in a second mode to process the component color video signals.

Figure 3:
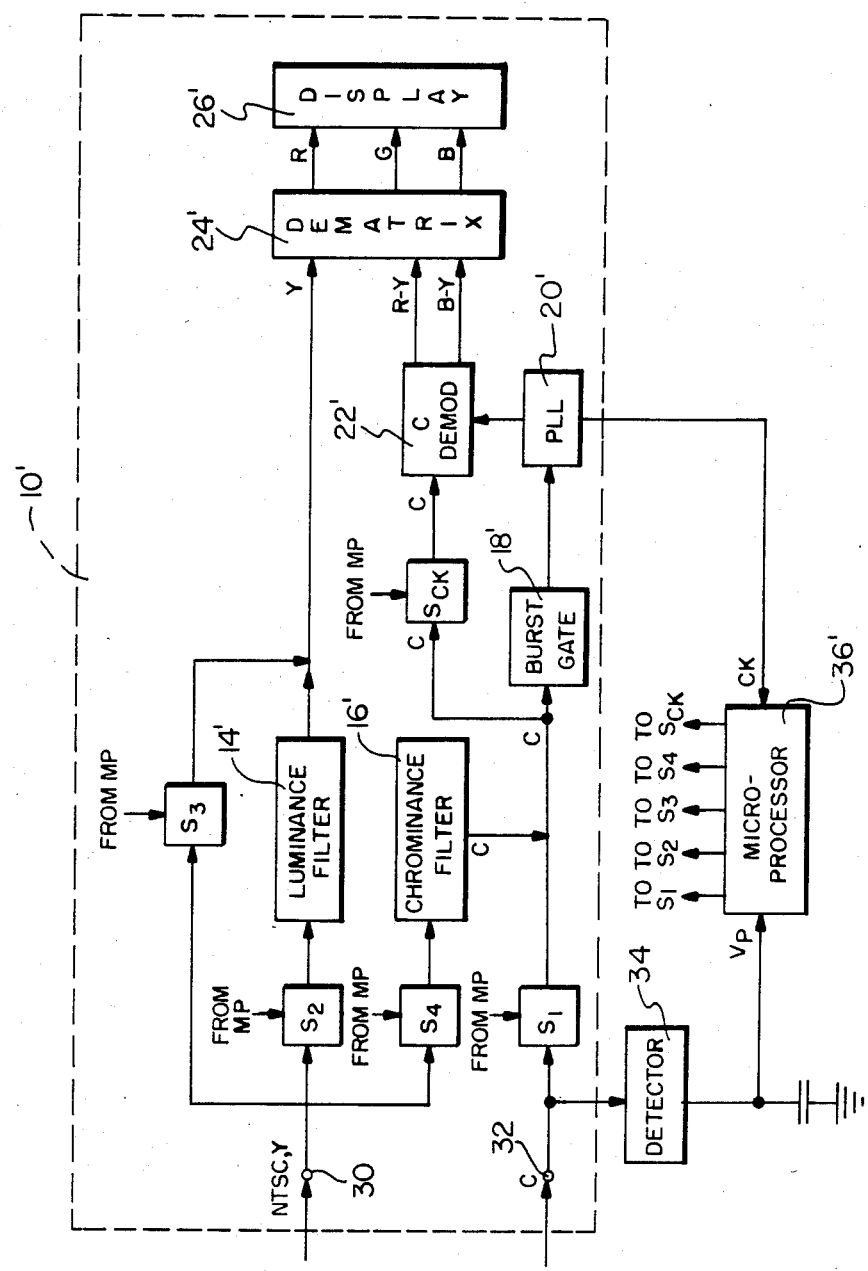
FIG. 3 is a more detailed block diagram of the apparatus of FIG. 2.

Referring now to FIG. 3, there is shown in more detail the apparatus of FIG. 2. As shown, apparatus 10' has similar components to the apparatus shown in FIG. 1. Thus, apparatus 10' includes a luminance filter 14' for separating the luminance component signal Y from a composite color video signal NTSC; a chrominance filter 16' for separating the chrominance component signal C from a composite color video signal NTSC; a burst gate 18' for detecting the 3.58 Mhz color burst signal; and a phase lock loop (PLL) circuit 20' which includes a crystal oscillator set to oscillate at the color subcarrier frequency. Apparatus 10' also includes chrominance demodulator (C DEMOD) 22' which demodulates the quadrature related chrominance component signals I, Q into R-Y and B-Y chrominance signals which are supplied along with luminance signal Y to dematrix circuit 24'. Circuit 24' produces R, G, and B color signals for driving the color display tube 26'.

According to a feature of the present invention, apparatus 10' is provided with a plurality of switches $S_1$, $S_2$, $S_3$, $S_4$, and $S_{ck}$. These switches are selectively actuated to open or closed positions by microprocessor 36' in response to the type of video signal received at inputs 30 and 32.

Figure 4:
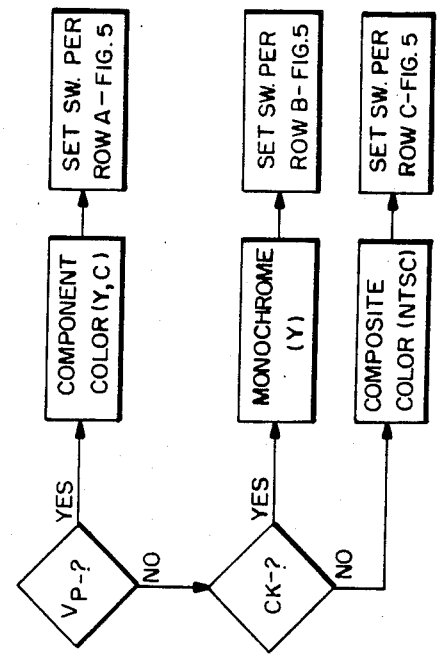
FIG. 4 is a flow chart showing operation of the apparatus of FIG. 3.

FIG. 4 shows a flow diagram illustrating the programming of microprocessor 36' of FIG. 3 for operation of apparatus 10' to process either composite color video signals, component color video signals, or monochrome video signals. FIG. 5 is a table of switch settings which are effected by microprocessor 36' according to the flow diagram of FIG. 4. When a component color video signal NTSC is received at inputs 30 and 32 such that the luminance component signal Y is received at terminal 30 and the chrominance component signal C is received at input 32, the detector 34 will detect the chrominance component and produce an indication signal $V_P$ which is supplied to microprocessor 36'. Receipt of this signal causes microprocessor 36' to set switches $S_1$–$S_4$ and $S_{ck}$ according to the values shown in Row A of the table of FIG. 5. Thus switch $S_1$ is closed; switch $S_2$ is open; switch $S_3$ is closed; switch $S_4$ is open; and switch $S_{ck}$ is closed. With this setting of the switches the luminance signal Y received at input 30 bypasses luminance filter 14' and is supplied directly to the dematrix circuit 24'. Similarly, the chrominance signal C received at input 32 bypasses the chrominance filter 16' and is supplied directly to chrominance demodulator 22'. Since switch $S_4$ is open, the presence of a luminance signal Y alone at input 30 does not produce a color killer signal CK which would cause deactivation of the chrominance processing circuitry.

When a composite color signal NTSC is received at input 30, there is no input at input 32. Thus, neither the chrominance detection signal $V_p$ nor a color killer signal CK are produced and the switches are set as indicated in Row C of the table of FIG. 5. Switch $S_1$ is open; switch $S_2$ is closed; switch $S_3$ is open; switch $S_4$ is closed; and switch $S_{ck}$ is closed. Thus, the composite color video signal NTSC received at input 30 is supplied to both luminance filter 14' and chrominance filter 16' which separate the luminance and chrominance signals Y, C for further processing by demodulator circuit 22' and dematrix circuit 24'. In such case bypass of filters 14' and 16' is inhibited.

When a monochrome Y video signal is received at input 30, although no chrominance indication signal $V_p$ will be produced by detector 34, a color killer signal CK will be produced by PLL circuit 20'. Thus, the switches will be set by microprocessor 36' as indicated in Row B of the table of FIG. 5. Switch $S_1$ is open; switch $S_2$ is open; switch $S_3$ is closed; switch $S_4$ is closed; and switch $S_{ck}$ is open. With this setting of the switches, the monochrome signal Y bypasses luminance filter 14' and is supplied directly to dematrix circuit 24'. At the same time the color killer circuit of PLL 20' detects an absence of a chrominance signal C so as to deactivate the chrominance circuitry so that color artifacts are not produced on display 26'.

Although video apparatus 10' is described as including a color television receiver it will be understood that such apparatus may for example be a video cassette recorder or other recording/reproducing device. Apparatus 10' may also be a video signal transmission device which for example may selectively amplify signals which are received at inputs 30 and 32. It will be appreciated that the apparatus as shown in FIG. 3 is described only with respect to relevant circuits of a color television receiver and that such a receiver has other circuits necessary for functioning of the device such as tuning and video detecting circuits, synchronization circuits, power supply circuits, and the like. Switches $S_1$–$S_4$ and $S_{ck}$ may be mechanical, solid-state or other type of switches.

The video signal apparatus of the present invention has several advantages. Through the selective detection of composite color or component color video signals, a video apparatus may be controlled so that circuitry used to separate components from a composite color video signal may be bypassed thus increasing the resolution and color fidelity of a reproduced image. Moreover, the apparatus of the present invention is simple to implement necessitating a minimum modification of existing video apparatus with reduced cost and circuit complexity.

The invention has been described in detail with respect to preferred embodiments thereof, but it will be understood that variations and modifications can be effected within the spirit and scope of the invention. For example, although the color component signals Y and C are indicated in connection with the aforementioned apparatus, signal processing apparatus for handling other forms/combinations of component signals (e.g., Y, B-Y, R-Y, or R, G, B) are within the scope of the invention.

What is claimed is:

1. Video apparatus comprising:
   means for selectively receiving at least composite color video signals and component color video signals having at least first and second components, said receiving means including first input means for selectively receiving either said composite color video signals or said first component of said component color video signals and second input means for receiving said second component of said component color video signals; and
   means for producing a control signal when a component color video signal is received by said receiving means, wherein said producing means (1) includes means for detecting the second component received by said second input means, and (2) produces said control signal in response to detection of said second component.

2. The apparatus of claim 1 including video signal processing means selectively operable in a first mode for processing composite color video signals in response to the absence of production of said control signal and in a second mode for processing component color video signals in response to the production of said control signal.

3. The apparatus of claim 1 wherein said receiving means receives component color video signals having a luminance component and a chrominance component and wherein:
   said first input means selectively receives said composite color video signals and said luminance component of said component color video signals;
   said second input means receives said chrominance component of said component color video signal; and
   wherein said producing means (1) detects said chrominance component received by said second input means and (2) produces said control signal in response to detection of said chrominance component.

4. Video apparatus comprising:
   video signal processing means for processing composite color video signals asnd component color video signals having at least two components, said means having first and second selectively operable but not necessarily mutually exclusive sets of signals processing circuits, respectively, for processing said composite and component color video signals;
   first input means for receiving either said composite color video signal or one component of said component color video signal and second input means for receiving another component of said component color video signal, wherein said first and second input means are coupled to said video signal processing means; and
   control means (1) for detecting whether a component color video signal is received by said second input means, and (2) for selectively operating said first set of signal processing circuits to process composite color video signals when such a signal is not detected and said second set of signal processing circuits to process component color video signals when such a signal is detected.

5. The apparatus of claim 4 wherein said received composite color video signal is in the form of an NTSC, PAL or SECAM signal and wherein said received component color video signal includes a luminance component and a chrominance component.

6. The apparatus of claim 4 wherein said control means includes a microprocessor which is programmed to selectively operate said first and second sets of signal processing circuits in response to whether a composite color or component color video signal is detected.

7. The apparatus of claim 5 wherein said control means includes a microprocessor which is programmed to selectively operate said first and second sets of signal processing circuits in response to whether a composite color or component color video signal is detected.

8. Video apparatus comprising:
   first input means for selectively receiving either a composite color video signal or one component of a component color video signal having at least two components;
   second input means for receiving the other component of said color component video signal;
   video signal processing means coupled to said first and second input means for selectively processing said composite color video signal and said component color video signal; and
   control means for controlling said video signal processing means (1) to process a component color video signal upon detection of receipt by said second input means of the other component of said component color video signal and (2) to process a composite color video signal when there is no detection of receipt of said other component of a component color video signal by said second input means.

9. The apparatus of claim 8 wherein said control means includes a microprocessor which is programmed to selectively operate said video signal processing means in said first and second modes in response to whether a composite color or component color video signal is detected.

10. The apparatus of claim 8 wherein said received composite color video signal is in the form of an NTSC, PAL or SECAM signal and wherein said received component color video signal includes luminance and chrominance components.

* * * * *